US009884407B2

(12) United States Patent
Ishikawa et al.

(10) Patent No.: US 9,884,407 B2
(45) Date of Patent: Feb. 6, 2018

(54) SHOT PROCESSING MACHINE

(75) Inventors: Mitsuo Ishikawa, Toyokawa (JP); Takuji Yamamoto, Toyokawa (JP)

(73) Assignee: SINTOKOGIO, LTD., Aichi (JP)

(*) Notice: Subject to any disclaimer, the term of this patent is extended or adjusted under 35 U.S.C. 154(b) by 142 days.

(21) Appl. No.: 14/407,386

(22) PCT Filed: Jul. 27, 2012

(86) PCT No.: PCT/JP2012/069177
§ 371 (c)(1),
(2), (4) Date: Apr. 2, 2015

(87) PCT Pub. No.: WO2013/186939
PCT Pub. Date: Dec. 19, 2013

(65) Prior Publication Data
US 2015/0290770 A1   Oct. 15, 2015

(30) Foreign Application Priority Data
Jun. 12, 2012   (JP) .................. 2012-132821

(51) Int. Cl.
*B24C 9/00* (2006.01)
*B24C 1/10* (2006.01)

(52) U.S. Cl.
CPC ............ *B24C 9/006* (2013.01); *B24C 1/10* (2013.01); *Y02P 70/179* (2015.11)

(58) Field of Classification Search
CPC .................. B24C 9/00; B24C 11/00
USPC ............ 451/87, 88, 89, 2, 38, 75
See application file for complete search history.

(56) References Cited

U.S. PATENT DOCUMENTS 5,782,677 A * 7/1998 Kanouse ............ B24B 31/023
                                                241/182
6,319,101 B1   11/2001 Vago
6,371,839 B2 * 4/2002 Izawa ...................... 451/75
(Continued)

FOREIGN PATENT DOCUMENTS

| CN | 102189496 A | 9/2011 |
|----|-------------|--------|
| GB | 663483 A | 12/1951 |
| JP | 54-23062 A | 2/1979 |

(Continued)

OTHER PUBLICATIONS

International Search Report with English Translation for PCT/JP2012/069177 dated Sep. 14, 2012, 4 pages.
(Continued)

*Primary Examiner* — Monica Carter
*Assistant Examiner* — Lauren Beronja
(74) *Attorney, Agent, or Firm* — Brinks Gilson & Lione

(57) ABSTRACT

Provided is a shot peening device with which recovered projection material and foreign bodies can be more precisely separated while inhibiting an increase in the size of the device. The shot peening device is provided with: a projector which projects projection material onto a workpiece (W); recovery mechanisms which recover the projection material projected by the projector; and a wind power sorting mechanism in which recovered projection material is allowed to fall freely while an upward air current is applied to the recovered projection material, and foreign bodies included in the recovered projection material are separated from the recovered projection material.

18 Claims, 6 Drawing Sheets

(56) References Cited

U.S. PATENT DOCUMENTS

| | | | | |
|---|---|---|---|---|
| 7,832,243 | B2 * | 11/2010 | Ushida | B24C 9/006 29/90.7 |
| 2010/0211419 | A1 * | 8/2010 | Nickolayev | G06F 17/30389 705/5 |

FOREIGN PATENT DOCUMENTS

| | | |
|---|---|---|
| JP | 4-17054 U | 2/1992 |
| JP | 9-57616 A | 3/1997 |
| JP | 10-7324 A | 1/1998 |
| JP | 11-28644 A | 2/1999 |
| JP | 2000-42925 A | 2/2000 |
| JP | 2001-38628 A | 2/2001 |
| JP | 2003-334761 A | 11/2003 |
| JP | 2011-79094 A | 4/2011 |
| JP | 2012-20359 A | 2/2012 |
| TW | 400267 B | 8/2000 |

OTHER PUBLICATIONS

Extended Search Report in corresponding European Application No. 12878768.6 dated Apr. 5, 2016, 8 pages.

* cited by examiner

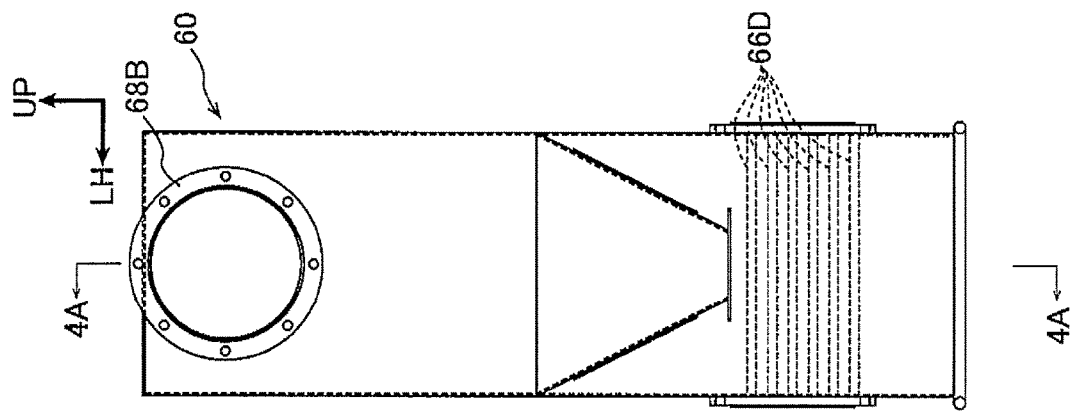
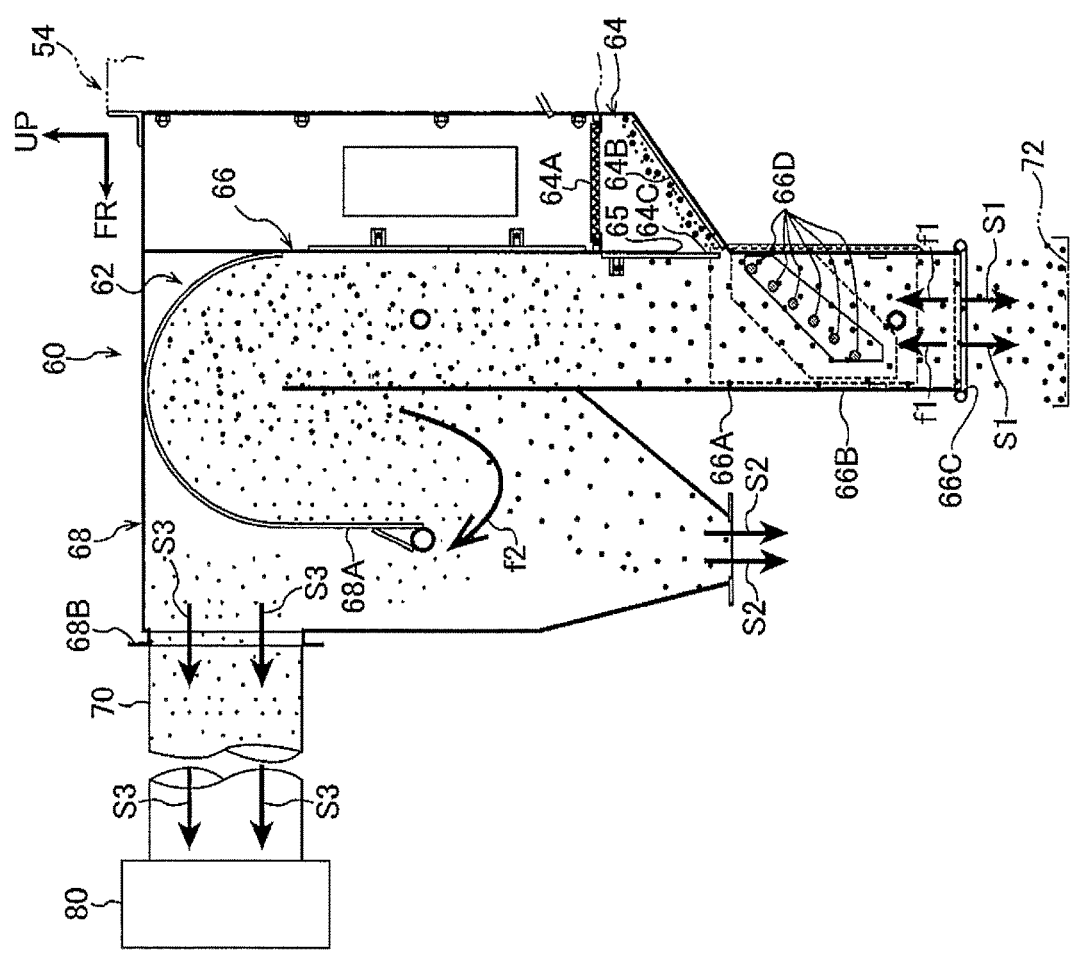

SHOT PROCESSING MACHINE

This application is a 371 application of PCT/JP2012/069177 having an international filing date of Jul. 27, 2012, which claims priority to JP 2012-132821 filed Jun. 12, 2012, the entire contents of which are incorporated herein by reference.

TECHNICAL FIELD

The present invention, in summary, relates to a shot processing machine, and more particularly to a shot processing machine for recovering blast material blasted onto workpieces and separating foreign matter from this recovered blast material.

BACKGROUND ART

A shot processing machines comprising separating machines which recover blast material blasted onto workpieces and separate foreign matter from this recovered blast material is known (for example, see Patent Document 1). In such machines, foreign matter is separated from blast material using a vibration sifter, for example.

PRIOR ART REFERENCES

Patent Documents

Patent Document 1: Chinese Patent Unexamined Publication CN102189496A

SUMMARY OF THE INVENTION

Problems the Invention Seeks to Resolve

However, such machines become enlarged due to the placement of a vibrating sifter within them.

The present invention was undertaken to solve the aforementioned problems, and has the object of providing a shot processing machine capable of accurately separating recovered blast material and foreign matter while constraining the increase in machine size.

Means for Resolving Problem

The invention is a shot processing machine comprising:
a projecting device for projecting blast material onto a workpiece;
a recovery mechanism for recovering blast material blasted by the projecting device;
and an air sorting mechanism for applying an upward air current to recovered blast material and allowing the recovered blast material to fall freely, thereby separating foreign matter mixed into the recovered blast material from that recovered blast material.

In the invention thus constituted, sorting accuracy is improved by allowing blast material (a mixture of blast material and foreign matter) recovered after blasting with a projecting device to fall freely as an upward air current is applied.

This is because sorting accuracy improves with longer exposure of the blast material and foreign matter to an air current.

In another preferred embodiment of the invention,
the air sorting mechanism comprises:
a freefall zone in which the upward air current is generated, and the recovered blast material is allowed to fall freely;
and a supply portion, the bottom most portion of which communicates with the free fall zone through an opening portion, by which recovered blast material is supplied;
whereby the opening portion is formed between a regulator plate disposed to extend in the vertical direction on the free fall zone side of the supply portion, and an inclined portion extending diagonally downward at an incline toward said regulator plate and toward the free fall zone of the supply portion.

In the invention thus constituted, the flow volume of recovered blast material is restricted by the regulator plate when flowing into the free fall zone, and is spread in the width direction of the regulator plate, so as to fall within the free fall zone spreading over the width direction of the regulator plate, which promotes separation of foreign matter by air currents.

In another preferred embodiment of the invention,
the air sorting mechanism comprises:
multiple dispersion rods placed across the free fall zone.

Using the shot processing machine thus constituted, recovered blast material is dispersed by multiple dispersion rods when free falling; an appropriate spacing is thus created between falling blast material, with the result that upward air currents flow approximately uniformly between the falling blast material, thereby facilitating the sorting (classification) of the mixture by upward air currents.

Another preferred embodiment of the invention comprises:
a convex receiving portion for receiving free fallen blast material, disposed at the bottom of the free fall zone.

In the invention thus constituted, the falling of the blast material is temporarily stopped by the receiving portion before colliding with members at the bottom of the free fall zone, thereby constraining wear by the blast material of components in lower members.

In another preferred embodiment of the invention,
the air sorter mechanism comprises a settling chamber communicating with the upper part of the free fall zone.

In this settling chamber, a bypass current is created by a guide plate, and foreign matter is separated into powder material carried by the bypass current and granular material, which falls.

In the shot blasting machine thus constituted, light weight matter among the foreign matter is separated into powder material carried by a bypass current in the settling chamber, and falling granular material.

Another preferred embodiment of the invention comprises:
a cabinet within which is formed a blast chamber wherein blast material is blasted, comprising a blast chamber entrance for loading workpieces into the blast chamber, and a blast chamber exit for discharging workpieces from the blast chamber;
a first shot curtain machine for causing blast material to fall in a curtain shape from the top of the blast chamber entrance;
a second shot curtain machine for causing blast material to fall in a curtain shape from the top of the blast chamber exit;
a recovery mechanism for recovering blasted blast material from the blast chamber;
and a distribution box for distributing blast material recovered by the recovery mechanism to the first shot curtain machine and the second shot curtain machine.

In the invention thus constituted, blast material blasted inside the projecting device is stopped or constrained from flying out of the blast chamber entrance or the blast chamber exit by blast material allowed to continuously fall from the first shot curtain machine and the second shot curtain machine.

In addition, because the blasted blast material is distributed by a distribution machine to an air sorting mechanism, a first shot curtain machine, and a second shot curtain machine, the amount of blast material supplied to the air sorting mechanism is optimized, and enlargement of the air sorting mechanism and dust collector is constrained.

In another preferred embodiment of the invention:

blast material from which foreign matter has been separated by an air sorting mechanism is supplied to the projecting device.

In a shot processing machine thus constituted, blast material from which foreign matter has been removed can be reused in a projecting device.

Another preferred embodiment of the invention comprises:

a conveyor means for conveying workpieces to a position at which blast material is blasted from a projecting device;

whereby the conveyor means comprises:

a chain conveyor belt having a rotationally driven endless chain, and a carrier attached to the outer perimeter of the chain for supporting workpieces;

and a pair of rotating rollers disposed on both sides of the carrier in the direction of workpiece transport, capable of rotating and swinging about an axial line extending in the direction of workpiece transport.

In a shot processing machine thus constituted, a workpiece loaded on a rotating roller turns by the rotation of the rotating rollers, and blast material is blasted over the entire surface of the workpiece, resulting in uniform shot processing.

In another preferred embodiment of the invention:

a variable adjustment mechanism is provided with which the spacing between the pair of rotating rollers can be variably adjusted.

Using the shot processing machine thus constituted, the spacing between the pair of rotating rollers can be set according to the size of the workpiece, therefore the length of the carrier in the vertical direction can be constrained.

For example, if a large workpiece is loaded on the pair of rotating rollers, the workpiece top end height position can be constrained by widening the spacing between the pair of rotating rollers, thereby enabling the length of the carrier supporting the workpiece to be constrained in the vertical direction, thus constraining the overall height of the machine.

Also, because the spacing between the pair of rotating rollers is variably adjustable, workpieces of various outside diameters can be loaded on the pair of rotating rollers, and shot processing can be applied to workpieces of various outside diameters.

In another preferred embodiment of the invention:

the bottom surface of the shot processing machine is formed to be flat.

In a shot processing machine thus constituted, there is no need to dig a pit, thereby reducing the labor and cost of installation.

Another preferred embodiment of the invention comprises:

a control device having: a calculating section for comparing the operating times of consumable parts with which the shot processing machine is equipped to pre-set lifespan times so as to calculate replacement timing for the consumable parts; and a display section capable of displaying the calculation results of the calculation section.

In a shot processing machine thus constituted, the lifespan of consumable parts can be easily determined.

Another preferred embodiment of the invention comprises:

a control device having a memory section into which information on the replacement history of consumable parts in the shot processing machine is input, for storing said replacement history information; and a display section capable of displaying the replacement history information stored in the memory section.

In a shot processing machine thus constituted, the replacement history of shot machine consumable parts can be easily determined.

Effect of the Invention

Using the present invention, a shot processing machine capable of accurately separating recovered blast material from foreign matter can be provided, while constraining machine enlargement.

BRIEF DESCRIPTION OF THE DRAWINGS

FIGS. 4(A) and 4(B) are diagrams showing a separator in the shot peening machine shown in FIG. 1. FIG. 4(A) is a cross section along line 4A-4A in FIG. 4(B); FIG. 4(B) is a plan view of a separator.

FIG. 5(A) is a front elevation; FIG. 5(B) is side view.

DETAILED DESCRIPTION OF THE PREFERRED EMBODIMENTS

Referring to FIGS. 1 through 6, a shot peening machine according to an embodiment of the present invention will be explained. Note that the arrow FR shown in these diagrams indicates the front side when the machine is viewed from the front; arrow UP indicates the upper side of the machine, and arrow LH indicates the left side when the machine is viewed from the front.

Figure 1:
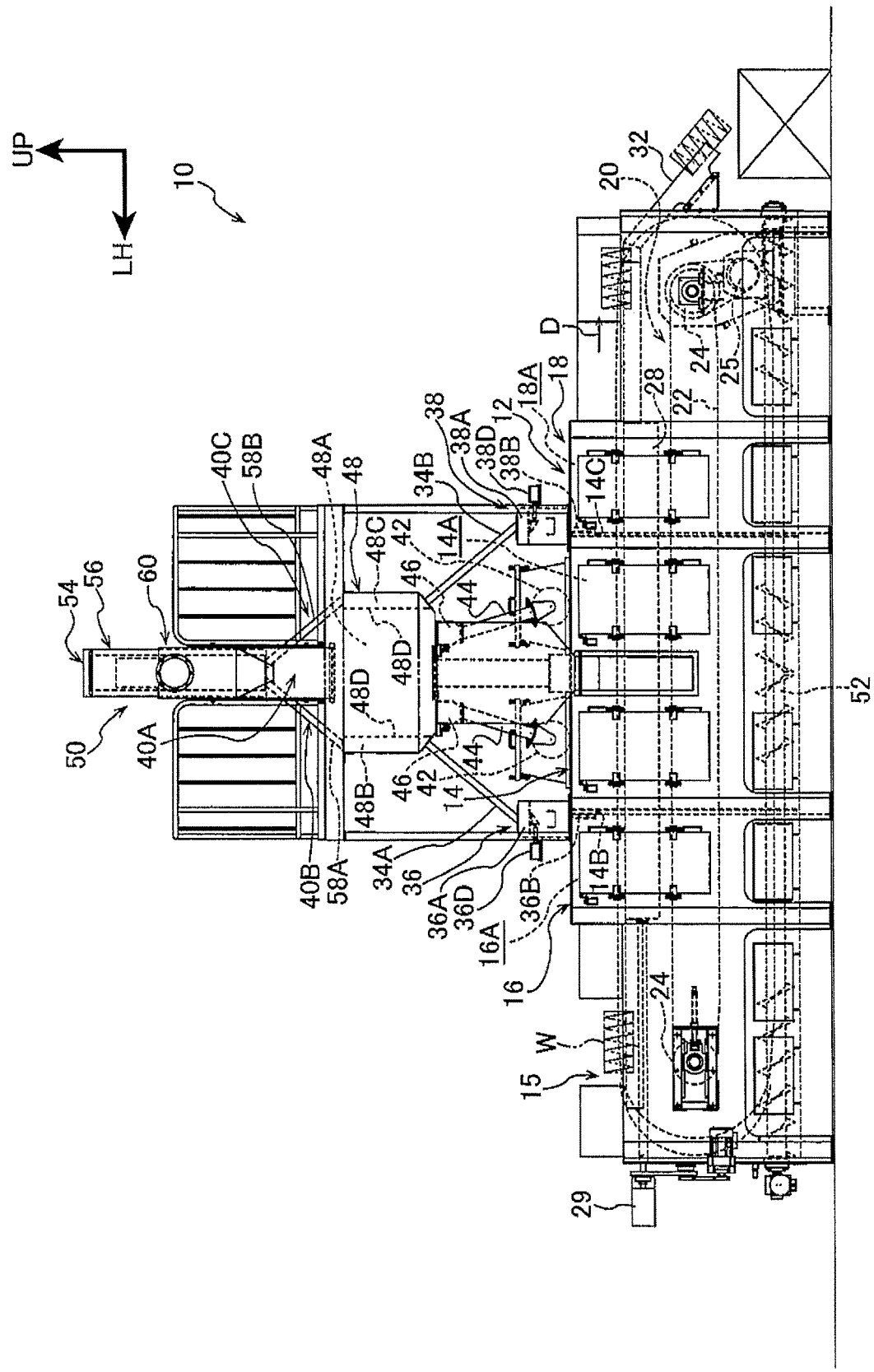
FIG. 1 is a front elevation of a shot peening machine in an embodiment of the present invention.
Figure 2:
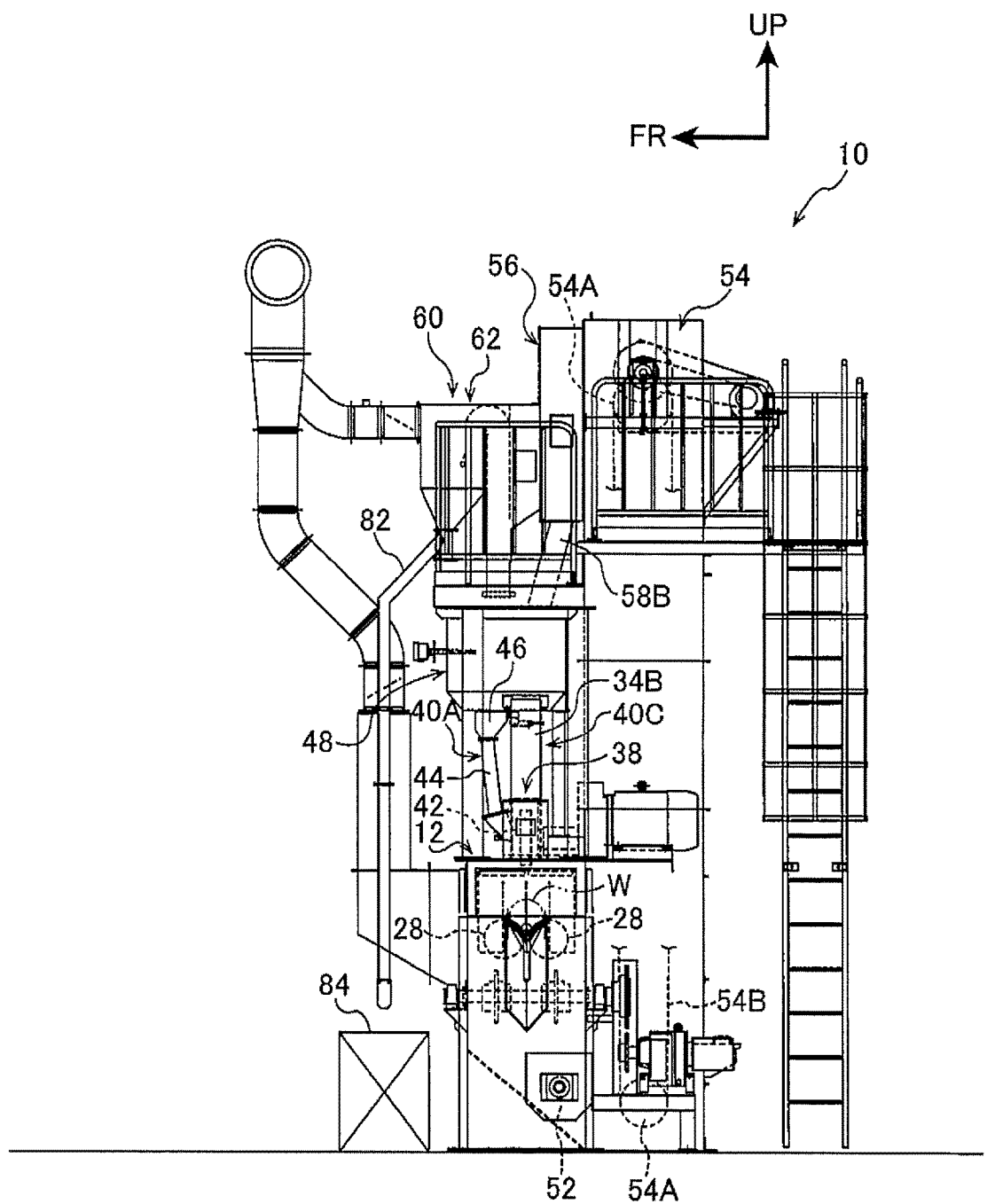
FIG. 2 is a right side view of the shot peening machine shown in FIG. 1.
Figure 3:
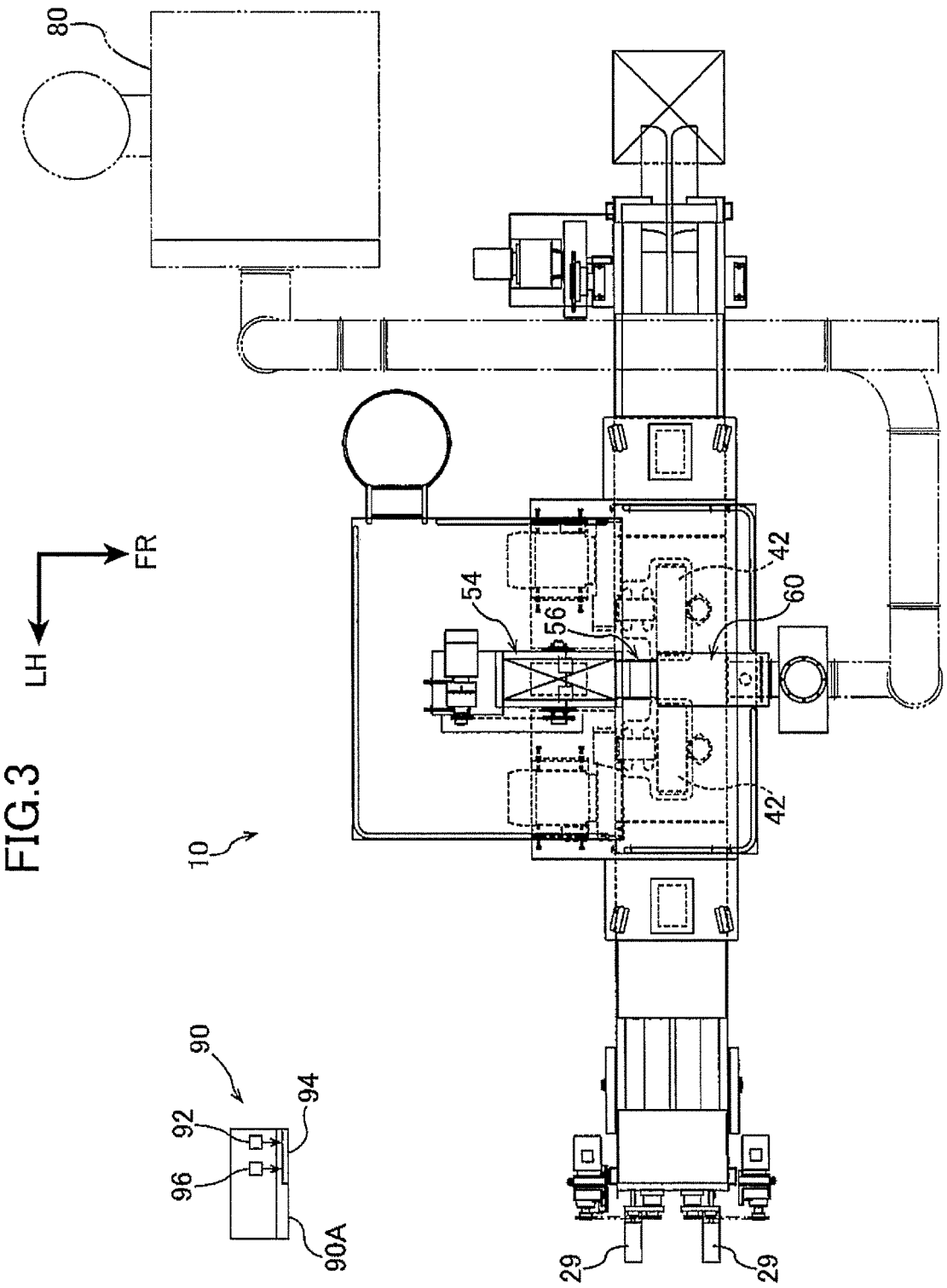
FIG. 3 is a plan view of the shot peening machine shown in FIG. 1.

In FIG. 1, the shot peening machine 10 is shown in a front elevation; in FIG. 2 the shot peening machine 10 is shown in a right side elevation; and in FIG. 3 the shot peening machine 10 is shown in plan view. Workpiece W in the shot peening machine 10 according to the present embodiment is a cylindrical product such as a coil spring. Note that arrow D shown as appropriate in the diagrams indicates the direction in which the workpiece W is transported.

As shown in FIG. 1, the shot peening machine 10 comprises a cabinet 12. The cabinet 12 comprises an outside wall portion for partitioning between an internal space and an external space in the shot peening machine 10, so that steel balls used as blast material (shot or shot material) inside the cabinet 12 do not scatter outside the shot peening machine 10. The bottom surface at the lower portion of the machine is shaped to be flat; i.e., it is set so that the height of the machine in the vertical direction is the same.

The cabinet 12 comprises a cabinet body 14 in an intermediate section in the direction of transport of the workpiece W. A blast chamber 14A (referred to as "blast booth," "processing chamber," "cleaning chamber") is formed inside the cabinet body 14. The blast chamber 14A is a booth for surface processing (in this embodiment, peening) of the workpiece W using blast material blasted from a projecting device 42, described below.

In the cabinet body 14, a blast chamber entrance 14B is formed on the upstream side (the left side in the figure) in the direction of transport of the workpiece W; a blast chamber exit 14C is formed on the downstream side (the right side in the figure) in the direction of transport of the workpiece W. the blast chamber entrance 14B is an opening for loading a workpiece W into the blast chamber 14A; the blast chamber exit 14C is an opening for discharging a workpiece W from the blast chamber 14A.

An upstream booth 16 forming the part of the cabinet 12 is adjacently disposed on the upstream side (the left side in the diagram) of the cabinet body 14 in the direction of transport of workpiece W. The upstream booth 16 forms a space 16A communicating with the blast chamber 14A through the blast chamber entrance 14B.

An upstream booth entrance (not shown) for loading a workpiece W is formed opposite the blast chamber entrance 14B of the cabinet body 14 on the upstream booth 16. In addition, further upstream in the direction of transport of the workpiece W, a setting portion 15 for setting workpiece W on the shot peening machine 10 is provided on the upstream booth 16. Note that if a workpiece W is heavy or difficult to work due to high temperature or the like, it is acceptable to provide a loading machine (not shown) such as a manipulator or handler on the setting portion 15 and mechanically load the workpiece W from this loading machine.

At the same time, a downstream booth 18 forming a part of the cabinet 12 is adjacently disposed on the downstream side (the right side in the diagram) of the cabinet body 14 in the direction of transport of the workpiece W. The downstream booth 18 forms a space 18A communicating with the blast chamber 14A through the blast chamber exit 14C.

A downstream booth exit (not shown) for discharging a workpiece W is formed opposite the blast chamber exit 14C of the cabinet body 14 on the downstream booth 18.

Multiple suspended curtain-shaped sealing bodies (not shown) extending in a direction perpendicular to the direction of transport of the workpiece W are hung from the ceiling of the upstream booth 16 and the ceiling of the downstream booth 18 to prevent scattering of the blast material. Each seal body is disposed to be mutually parallel, separated by a predetermined spacing in the direction of transport of the workpiece W. These seal bodies are curtain-shaped members consisting of multiple pieces of long dimension elastic and plastic material, and are arranged to bend in the direction of transport of the workpiece W when the workpiece W passes through them.

A chain conveyor 20 for continuously transporting the workpiece W is disposed inside the cabinet 12. This chain conveyor 20 comprises endless chains 22. The endless chains 22 are wound around a sprocket 24 disposed on the loading side, and the sprocket 24 disposed on the discharge side. The sprockets 24 are linked to a drive source 25 such as a motor and rotationally driven.

Figure 5B:
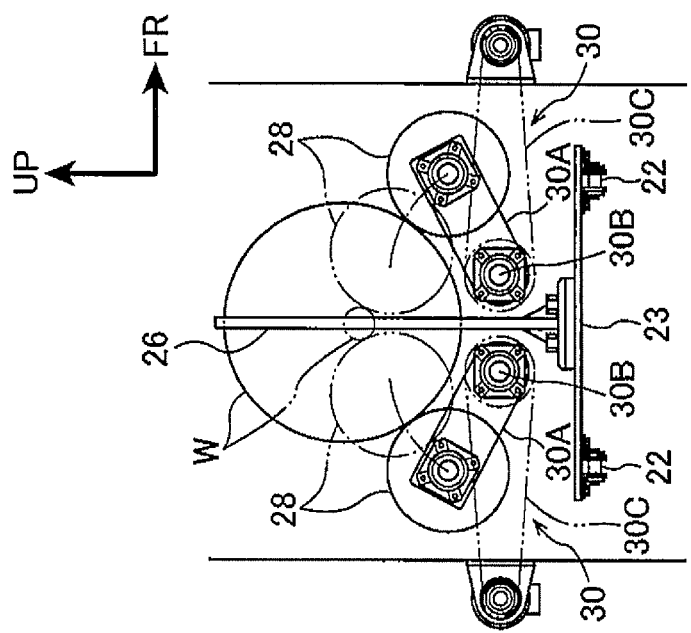
FIGS. 5(A) and 5(B) are diagrams showing a displacement adjustment mechanism for a spinner-roller in the shot peening machine shown in FIG. 1.
Figure 5A:
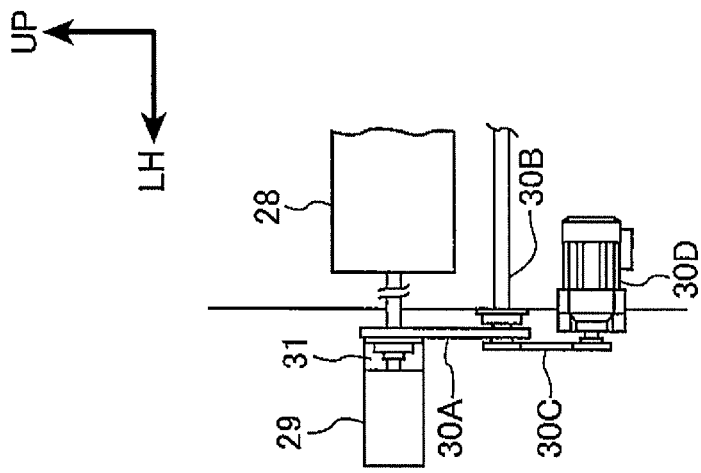
Figure 6:
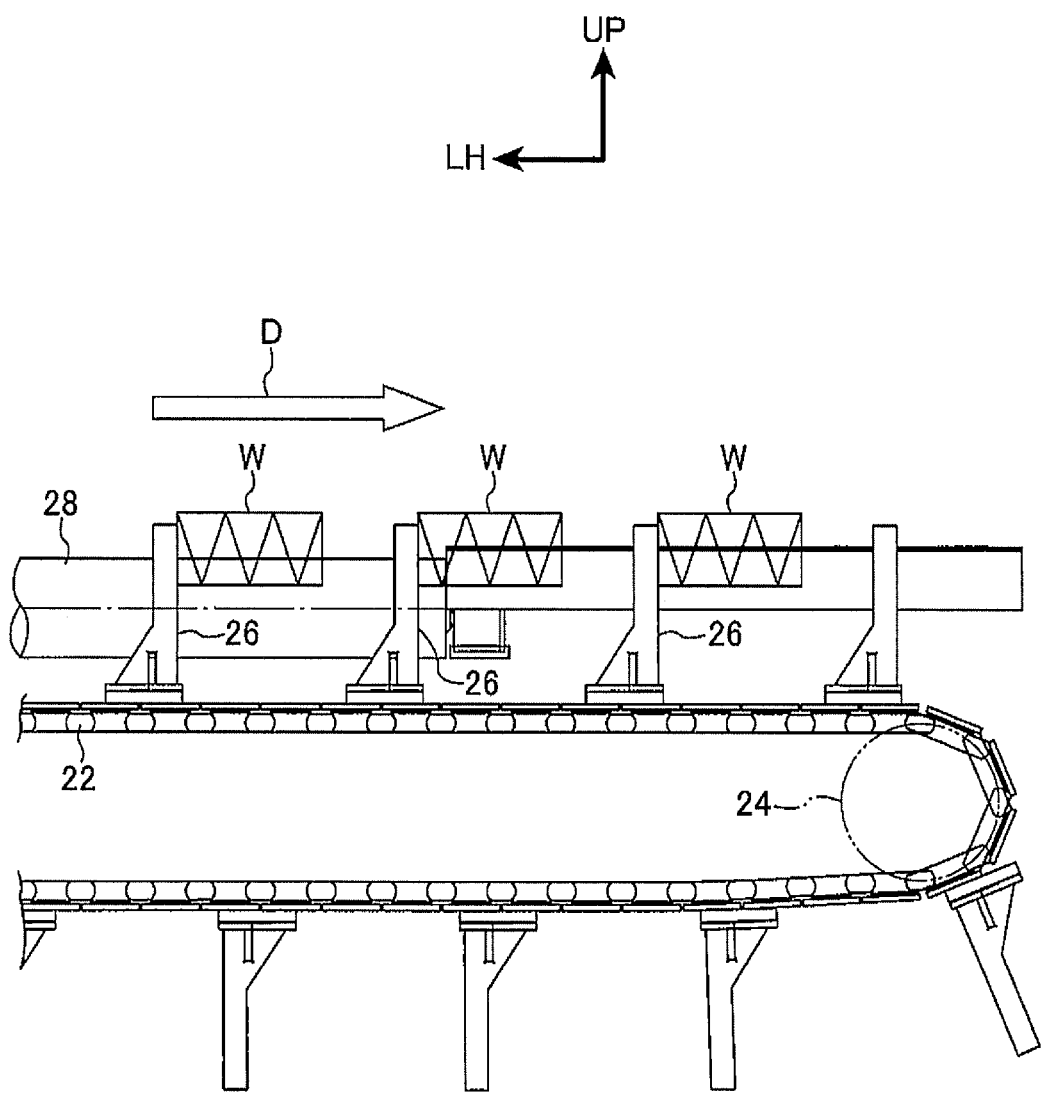
FIG. 6: A front elevation showing the state in which a workpiece is being transported in the shot peening machine shown in FIG. 1.

FIG. 6 is a front elevation showing the state in which the workpiece W is being transported by the chain conveyor 20. Note that spinner-rollers 28 at the front of the diagram, described below, are omitted in FIG. 5. As shown in FIG. 6, multiple carriers 26 for supporting the workpiece W are attached to the outer perimeter surface of the chains 22. The main part of the carriers 26 is rod-shaped; they are disposed at equal spacings along the longitudinal direction of the chains 22; the end portion of workpiece W is supported on the upstream side in the direction of transport when turning around the chains 22, and the workpiece W is continuously transported. As shown in FIG. 5(B), the chains 22 form a left-right pair; the carriers 26 are vertically placed on the chain plate 23, which is stretched across the left-right pair of the chains 22.

The pair of spinner-rollers 28 formed of rotating rollers is disposed on the upper side of the chains 22 and on both sides of the carriers 26. The pair of spinner-rollers 28 is disposed on both sides of the workpiece W in the direction of transport, and the workpiece W is loaded onto the pair of the spinner-rollers 28. Note that a transport means for transporting workpiece W is constituted by this chain conveyor 20 and the spinner-rollers 28.

A variable adjustment mechanism 30 for variably adjusting the distance between the spinner-rollers 28 is installed on the shaft portion of the pair of spinner-rollers 28. The variable adjustment mechanism 30 comprises a pair of rotating arms 30A disposed on both sides of the carriers 26; the tip portions of the rotating arms 30A support the center axis of the spinner-rollers 28 so that it can rotate. The base end of each rotating arm 30A is disposed at a position closely adjacent to the carrier 26, and respectively affixed to the rotary shaft 30B.

As shown in FIG. 5(A), the rotary shaft 30B is rotatably supported on the machine frame side, and is connected through an endless belt 30C on the shaft side of a drive motor 30D, which serves as a drive source. In other words, the variable adjustment mechanism 30, by the rotation of the rotary shaft 30B in response to the rotation of the drive motor 30D, causes the rotating arms 30A to drive, such that the shaft portion of the spinner-rollers 28 is displaced along an arcuate track.

In the constitution of the present embodiment, when a large workpiece W is loaded onto the pair of the spinner-rollers 28, the height position of the pair of spinner-rollers 28 can be lowered by deflecting the shaft portion of the pair of the spinner-rollers 28 in an arcuate form, causing them to mutually separate. Therefore compared to another variable adjustment mechanism for horizontally moving the shaft portion of the pair of spinner-rollers 28 between a close position and a separated position, an machine comprising the variable adjustment mechanism 30 of the present embodiment enables the top end height position of a large workpiece W to be kept low, so that the length of the carriers 26 can be kept low, thereby constraining the height of the overall machine.

Also, as shown in FIG. 5(A), drive motors 29 are affixed to the tip portion of the rotating arms 30A through brackets 31, and the output shafts of the drive motors 29 are linked to the shaft portions of the spinner-rollers 28. This enables the spinner-rollers 28 to be rotationally driven about a center axis. The pair of spinner-rollers 28 shown in FIG. 5(B) is rotationally driven in the same direction about a center axis. It is also preferable for the pair of spinner-rollers 28 to have the same diameter, and to be rotated at the same fixed speed.

To obtain a stable peening effect, it is important to control the position of the workpiece W. To accurately control the position of workpiece W requires that the rotating mechanism of the spinner-rollers 28 and the workpiece W transport mechanism operate accurately.

It is preferable to equip the spinner-roller 28 rotating mechanism with a rotating roller inverter to set roller rpm according to finish quality, and to use high precision, long life parts for stable product transport. By providing a rotating roller inverter, roller rpm can be (easily) set in accordance with finish quality, and control can also be linked to transport speed. By using high precision, long life components for the spinner-rollers 28, transport problems caused by premature wear can be prevented or effectively suppressed, and catching is reduced by the minimal height differences.

It is preferable for the special chains to be used as the chains 22 in the workpiece W transport mechanism in order to achieve stable product transport, and to provide an inverter to set transport speed according to finish quality.

As special chains, chains with good clearance and wear resistance are used in order to suppress biting by the blast (shot) material. Use of this type of special chains extends the life of the workpiece W transport mechanism and enables transport problems to be prevented or effectively suppressed. Provision of an inverter allows for easily changing the transport speed setting in accordance with finish quality, and permits linking of the control to rotational rpm.

As shown in FIG. 1, a discharge chute 32 is installed on the furthest downstream point in the transport direction of the workpiece W in the cabinet 12. The discharge chute 32 is disposed so that its top end portion is on a line extending from the spinner-rollers 28, and it inclines downward in a direction moving away from the cabinet 12 side. I.e., the discharge chute 32 is a member which guides a workpiece W loaded on the spinner-rollers 28 and is moved by the carriers 26 of the chain conveyor 20 (see FIG. 6) to outside of the cabinet 12.

Multiple projecting devices 42 (in one example of this embodiment there are a total of 2 units) are attached on the upper side of the transport pathway for the workpiece W inside the cabinet body 14. Projecting devices 42 are centrifugal projecting devices of a known structure, which impart centrifugal force to blast material (shot) inside a control cage through the rotation of an impeller comprising multiple blades; blast material is released through an opening window in the control cage.

I.e., the projecting device 42 accelerates blast material using centrifugal force and blasts vertically downward or diagonally downward onto the workpiece W transported to the blast chamber 14A. In the present embodiment, multiple units of the projecting device 42 are installed, but a configuration using a single projecting device 42 is also acceptable.

We here provide a supplemental explanation of the shot blast management, which is important for obtaining a stable peening effect. Note that in order to obtain a stable peening effect, it is also important to manage shot grain size; this point is explained below.

Shot flow volume, impeller rpm, and shot pattern are important items in managing shot blasting.

With respect to shot flow volume, a shot tank level meter and an impeller ammeter with lower limit detection are desirable in order to stably blast an appropriate amount of the blast material. A shot tank level meter is attached to a blast material hopper 48, described below, and is a measuring instrument for controlling shot supply timing.

An impeller ammeter with lower limit detection detects an insufficiency in blast amount, and when there is insufficient blasting, displays an abnormal state indication, also stopping the machine; this is a machine for preventing the outflow of insufficiently processed defective products.

Regarding impeller rpm, in order to set an appropriate blast speed matched to finish quality and maintain that state, it is desirable to check the state (wear and stretch) of the V belt used to transfer drive force to the impeller, and to provide an impeller inverter. By using an impeller inverter, changes in the impeller rpm can be (easily) made to match finish quality.

Regarding the blast pattern, in order to projecting the blast material onto a workpiece at an appropriate blasting position, it is desirable to provide functions for displaying a control gauge angle (a reference position display using an arrow-labeled plate) and to provide notice of replacement times for impeller-related consumable parts (blades, control cage, distributor, etc.). The purpose of the latter is to prevent changes in the blasting position or blasting amount due to wear in the impeller-related parts.

A blast material introducing pipe 44 (also called an "introducing pipe") is disposed on the upper side of each projecting device 42. The top end of the blast material introducing pipe 44 is connected to a blast material hopper 48 (shot tank) through a cut gate 46 (flow control device). Blast material hopper 48 is a hopper for temporarily holding blast material. In main portion 48A, which is internal space in the blast material hopper 48 of the present embodiment, the upstream and downstream sides in the workpiece W transport direction are partitioned by a partition wall 48D, and the two sides in the direction perpendicular to the workpiece transport direction are partitioned by the side portions 48B, 48C.

The above-described cut gate 46 is connected to the bottom side of main portion 48A of blast material hopper 48. Note that the cut gate 46 is an opening and closing gate for adjusting the flow volume of blast material supplied from the main portion 48A of the blast material hopper 48.

A first shot curtain machine 36 is connected through a supply pipe 34A to the bottom side of the side portion 48B on the left side of the blast material hopper 48. First shot curtain machine 36 is disposed on the upper side of the blast chamber entrance 14B, and affixed to the cabinet 12. First shot curtain machine 36 comprises a container portion 36A connected to the supply pipe 34A, and comprises a downward facing rectangular pipe 36B, connected to the bottom portion of the container portion 36A. The rectangular pipe 36B is formed into a rectangular tube shape, and used to allow blast material to flow out.

The internal space in the container portion 36A is partitioned by an upper partitioning panel into an upper space and a lower space. A gate mechanism 36D capable of opening and closing an opening on the upper partitioning panel is installed on the first shot curtain machine 36. A box-shaped receiving portion opening upward is provided on the lower side of the opening portion of the partitioning panel inside container portion 36A; the receiving portion is constituted to temporarily receive blast material falling through the opening in the upper partitioning panel, then to supply that material to the bottom side.

With a first shot curtain machine 36 thus constituted, blast material supplied from the supply pipe 34A is made to fall in a continuous curtain shape from the upper portion of the blast chamber entrance 14B via the container portion 36A and through the rectangular pipe 36B, thereby creating what is known as a shot curtain. I.e., the blast chamber entrance 14B comprises a structure for opening and closing a shot curtain by the opening and closing of a gate in the gate mechanism 36D.

Also, a second shot curtain machine 38 is connected through a supply pipe 34B to the bottom side on the side portion 48C on the right side of the blast material hopper 48. Second shot curtain machine 38 is disposed on the upper side of the blast chamber exit 14C, and affixed to the cabinet 12. The second shot curtain machine 38 comprises a container portion 38A connected to the supply pipe 34B, and comprises a downward facing rectangular pipe 38B, connected to the bottom portion of the container portion 38A. The rectangular pipe 38B is formed in the shape of a rectangular tube and used for blast material outflow.

The internal space in the container portion 38A is partitioned by an upper partition panel into an upper space and a lower space. A gate mechanism 38D capable of opening and closing an opening on the upper partition panel is installed on the second shot curtain machine 38. A box-shaped receiving portion opening upward is provided on the lower side of the opening portion of the partitioning panel inside the container portion 38A; the receiving portion temporarily receives blast material falling through the opening in the upper partitioning panel, then supplies that material to the bottom side.

With a second shot curtain machine 38 thus constituted, blast material supplied from the supply pipe 34B is made to fall in a continuous curtain shape from the upper portion of the blast chamber exit 14C via the container portion 38A and through the rectangular pipe 38B, thereby creating what is known as a shot curtain. I.e., the blast chamber exit 14C comprises a structure for opening and closing a shot curtain by the opening and closing of a gate in the gate mechanism 38D.

At the top of the cabinet 12, the projecting device 42 disposed between the first shot curtain machine 36 and the second shot curtain machine 38 is linked to a circulation machine 50 through a blast material introducing pipe 44, a cut gate 46, and a main portion 48A of a blast material hopper 48. The circulation machine 50 is a machine for transporting blast material blasted by the projecting device 42 and circulating it back to the projecting device 42, and comprises a lower portion screw conveyor 52 on the lower side of the chain conveyor 20 within the cabinet 12.

The lower portion screw conveyor 52 is horizontally disposed in the longitudinal direction of the workpiece W transport direction. The spiral winding directions of the screw blades on the lower portion screw conveyor 52 are opposite at sites disposed on the upstream and downstream sides in the shot peening machine 10 direction of transport. As a result, the lower portion screw conveyor 52, by rotating about an axis, is able to transport blasted blast material and the like from the shot peening machine 10 upstream and downstream transport directions to the center, so that blast material, etc. can be collected in one location.

The center portion of the lower portion screw conveyor 52 in the shot peening machine 10 transport direction is placed adjacent to the lower collection section of a bucket elevator 54 (FIG. 2), disposed in the recovery pathway for blast material. The result is that the bucket elevator 54 receives, from the lower portion screw conveyor 52, the blast material etc. transported to the center portion by the lower portion screw conveyor 52 from the upstream and downstream sides in the transport direction of the shot peening machine 10.

The bucket elevator 54 is a known structure, so a detailed explanation thereof is here omitted, but it has a structure in which an endless belt 54B is wound around a pulley 54A disposed at the top and bottom portions of the shot peening machine 10, and a large number of buckets (not shown) are attached to this endless belt 54B.

The pulley 54A is rotationally driven by a motor. This rotational driving causes bucket elevator 54 to scoop up the blast material and the like (a mixture containing the blast material blasted at a workpiece W, and powder/granular foreign matter) which has dropped to the lower part of the shot peening machine 10 and been recovered by the lower portion screw conveyor 52, transporting it from the bottom portion to the top portion thereof (the top side of cabinet 12).

In the present embodiment, the blast material recovery mechanism is constituted by the lower portion screw conveyor 52 and the bucket elevator 54, etc.

A distribution box 56 is disposed adjacent to the machine front side on the top end portion of the bucket elevator 54, and is through-connected to the distribution box 56 via the top discharge exit (ejection port) on the bucket elevator 54.

As shown in FIGS. 1 and 2, the distribution box 56 distributes blast material blasted from the buckets in the bucket elevator 54 to a first route 40A for supplying the projecting device 42, a second route 40B for supplying the first shot curtain machine 36, and a third route 40C for supplying the second shot curtain machine 38.

The first route 40A is the route by which blast material reaches the projecting device 42 from the distribution box 56 through a separator 60, the main portion 48A of the blast material hopper 48, the cut gate 46, and the blast material introducing pipe 44.

Also, the second route 40B shown in FIG. 1 is the route by which blast material from the distribution box 56 reaches the first shot curtain machine 36 through the distribution pipe 58A, the side portion 48B on the left side of the blast material hopper 48, and the supply pipe 34A.

Moreover, the third route 40C is the route by which blast material from the distribution box 56 reaches the second shot curtain machine 38 through the distribution pipe 58B, the side portion 48C on the right side of the blast material hopper 48, and the supply pipe 34B.

As shown in FIG. 2, the top portion discharge side of the bucket elevator 54 is connected via the distribution box 56 to the separator 60 (the air sorting mechanism 62), and is connected through the distribution box 56, and not through the separator 60 (the air sorting mechanism 62), to the first shot curtain machine 36 (see FIG. 1) and the second shot curtain machine 38.

FIGS. 4(A) and 4(B) show the constitution of the separator 60 (opposing-type classifier) comprising an air sorting mechanism 62. FIG. 4(A) is a side view cross section of the separator 60 (a cross section along line 4A-4A in FIG. 4(B)); FIG. 4(B) is a front elevation of the separator 60. Note that in the explanation of FIGS. 4(A) and 4(B) which follows, the direction which is the same as the machine left-right direction is referred to as the separator width direction.

The separator 60 is placed on a recovery path for recovering blast material blasted onto the workpiece W; as shown in FIG. 4(A), it comprises a settling chamber portion 68 connecting to the air intake side of a dust collector 80. A flange 68B (see FIG. 4(B)) for connecting ducts is formed on the top portion of the settling chamber portion 68.

Note that dust collector 80 has the purpose of recovering foreign matter (impurities) such as fine dust, etc. mixed into the blast material, and comprises an air intake machine (blower) for intaking air, and is connected to the settling chamber portion 68 through the suction duct 70 (separator duct). An opposing air sorter 66 is disposed on the air current upstream side of the settling chamber portion 68. A supply portion 64 for supplying blast material and the like discharged from the top discharge port on the bucket elevator 54 is placed on the opposite side to the settling chamber portion 68 side of the opposing air sorter 66.

A mesh-shaped screen 64A for dividing the supply portion 64 into two parts, top and bottom, is horizontally attached to the supply portion 64. The coarseness of the mesh in the screen 64A is set at a size permitting blast material to pass through. An inclined portion 64B is formed below the screen 64A on the supply portion 64. The inclined portion 64B is disposed on the upstream side of the opposing air sorter 66 flow path, inclining to the opposing air sorter 66 side facing downward (i.e., diagonally downward), and serves as a region into which a mixture of blast material and foreign matter supplied to the opposing air sorter 66 (free fall zone 66B) falls in a fluid motion.

A regulator plate 64C disposed to block the top side of the through opening 65 to the opposing air sorter 66, is disposed on the furthest downstream portion of the supply portion 64. The regulator plate 64C is a plate-body extending in the separator width direction (in a vertical direction relative to the paper surface in FIG. 4(A)). The top end portion of the regulator plate 64C is suspended downward by being affixed to a partition between the supply portion 64 and the opposing air sorter 66 on the upper side of the through opening 65, and is disposed to form a long and narrow gap extending in the separator width direction between the bottom end edge of the regulator plate 64C and the downstream end of the inclined portion 64B. A mixture of blast material and foreign matter flows out through this gap. Note that the height position of the regulator plate 64C can be adjusted.

The inclined portion 64B is placed on the flow path upstream side of the opposing air sorter 66, which causes the mixture to free fall, and the regulator plate 64C has the function of fully spreading and making uniform the layer of powder and granular matter (the mixture including blast material) flowing out from the supply portion 64 to the opposing air sorter 66, across the separator width direction (the direction vertical to the paper surface in FIG. 4(A)).

The opposing air sorter 66 comprises a perimeter wall portion 66A cylindrically formed and extending up and down in the shot peening machine 10. The inside of the perimeter wall portion 66A is used as an air passage, and on the middle portion in the longitudinal direction a gap formed between the bottom end edge of the regulator plate 64C and the downstream end of the inclined portion 64B opens as a communicating port with the supply portion 64.

The inside space in the site further under the portion communicating with the supply portion 64 in the perimeter wall portion 66A is used as a free fall zone 66B for permitting the mixture to free fall.

The bottom end opening 66C of the perimeter wall portion 66A is used as a downward-opening air introducing port; a mesh screen (not shown) is stretched horizontally around the outer circumference thereof. Therefore when the dust collector 80 operates in the free fall zone 66B, outside air which has passed through the screen flows in from the bottom end opening 66C of the perimeter wall portion 66A, and an upward air current f1 passing through the perimeter wall portion 66A is generated.

Multiple dispersion rods 66D are attached at the bottom of perimeter wall portion 66A so as to cross the free fall zone 66B. The dispersion rods 66D have a prism or columnar shape, and are separated by spacing and positioned so as to be increasingly lower as they separate from the inclined portion 64B on a line extending from the inclined portion 64B. The dispersion rods 66D are constituted to disperse, within the free fall zone 66B, a mixture of blast material and foreign matter falling freely inside the free fall zone 66B. The dispersion by the dispersion rods 66D of the mixture of free falling blast material and foreign matter produces an appropriate space between the free falling mixture material, such that the upward air current f1 inside the free fall zone 66B flows in an approximately uniform manner between the falling mixture material. As a result, the upward air currents flow approximately uniformly between the free falling blast material and foreign matter, facilitating sorting (classifying) of mixture material using an upward air current.

The spacing between the dispersion rods is set so that no blast material accumulates on the dispersion rods, at a width not interfering with the air current f1, and so that the free falling blast material and foreign matter can be evenly dispersed.

A concave (plate shaped) receiving portion 72 is placed at a position opposite the bottom end opening 66C on the perimeter wall portion 66A, at the bottom side of the free fall zone 66B in the air sorting mechanism 62. The receiving portion 72 is used to prevent wear caused by the blast material; after temporarily receiving the free falling blast material and stopping its fall, it supplies the same to the main portion 48A (see FIG. 1) of the blast material hopper 48 on the bottom side thereof.

Using the above-described configuration, by allowing the mixture of the blast material and powder and granular foreign matter to free fall while applying the upward air current f1, the opposing air sorter 66 separates light weight matter carried by the air current f1 from falling heavy matter (see the arrow S1 direction).

More specifically, the opposing air sorter 66 sorts the "small grain size, light items" (foreign matter) which is carried by the air current f1 from falling "large grain size, heavy items" (blast material).

A guide plate 68A is disposed on the top portion of a settling chamber portion 68 so as depend from the upper wall side. The guide plate 68A guides air containing powder and granular material suctioned into the interior of the settling chamber portion 68 under the suction force of a dust collector 80; a bypass current f2 is generated toward that air as a classifying current.

That is, the settling chamber portion 68 separates (sorts) particles in suctioned-in air using a bypass current f2. More specifically, the settling chamber portion 68 places in an air current and discharges (arrow S3) to the dust collector 80 side the fines (powder material) having a smaller grain size among the suctioned powder and granular matter (foreign matter), and allows the larger grain size, heavy fines (granular material), etc. to drop (arrow S2), discharging these to the course discharge case 84 side through the course ejection pipe 82, shown in FIG. 2.

To obtain a stable peening effect, management of shot grain size is important, and the constitution of the classifying machine (the separator 60) and management of the dust collection air volume are key points. For the classification machine, an opposing-type classification machine is adopted as described above in order to maintain shot grain size. Use of this type of opposing-type classification machine allows for more accurate (refined) grain size control compared to a perpendicular classification machine. For managing dust collection air volume, it is preferably to install a differential pressure upper limit switch on dust collector 80 or the like (see FIGS. 3 and 4(A)) to maintain the classification machine performance, thereby imparting a differential pressure upper limit detection function, so that an abnormal display can be made when the system has dropped below the required air flow.

Note that in the shot peening machine 10, in order to obtain a stable peening effect it is also important to manage consumables, and displaying replacement times is a key point for preventive maintenance. Therefore it preferable to establish, for example, a means to give notice regarding consumables to the control panel 90A etc., shown in FIG. 3, and to display replacement timing on a touch panel, or to display consumable replacement history on the control panel 90A or the like, so that replacement cycles for consumables can be understood.

Consumables included in the shot peening machine 10 include the consumables included in the projecting device 42, shown in FIGS. 1-3, the consumables included in the transport mechanism for transporting the workpiece W, the consumables included in the circulation machine 50, and the consumables related to the protective liner inside the blast chamber 14A.

The consumables included in the projecting device 42 include, for example, components related to the blades, control cage, distributor, and liner. Consumables included in the transport mechanism for transporting workpiece W include, for example, spinner-rollers 28, chains 22, carriers 26 and transport guides. Consumables included in the circulation machine 50 include, for example, lower portion screw conveyor 52, endless belt 54B of bucket elevator 54, and the buckets in bucket elevator 54.

As shown in FIG. 3, in the present embodiment a control device 90 comprising a control panel 90A is equipped with a calculation section 92. The calculation section 92 is constituted by a computer or the like; the replacement timing for each consumable is calculated for each consumable included in the shot peening machine 10 by comparing its operating time tx (wear time) with a pre-set lifetime tz. Here the calculation is made assuming the operating time tx is the same as the projecting device 42 blasting time, and is integrated by sequencer control. A display section 94 (display) is installed on control panel 90A, and the display section 94 is capable of displaying the results of calculations by the calculation section 92.

The control device 90 causes all or part of the calculation section 92 calculation results to be displayed on the display section 94 in response to manipulations of the control panel 90A, etc. In the latter case (partial display), the control device 90 may also comprise an identifying section (not shown) for identifying the displayed object. By comparing operating time tx with pre-set standard time ta, which is shorter than lifespan time tz, the identifying section identifies, for each consumable included in the shot peening machine 10, whether operating time tx has exceeded standard time ta. The control device 90 implements a control so that a display is made in the display section 94 of the replacement timing for only those consumables for which operating time tx is determined by the identifying section to exceed standard time ta.

The control device 90 also comprises a memory section 96. Replacement history information about consumables include in the shot peening machine 10 is input by a worker from the control panel 90A, for example. The memory section 96 stores replacement history information for each consumable include in the shot peening machine 10. At the same time, the display section 94 can display replacement history information stored in the memory section 96. I.e., if an operation is performed at the control panel 90A to request display of replacement history information, for example, replacement history information is displayed on the display section 94.

The memory section 96 may be used for storing information about past operating anomaly history, and the display section 94 can display operating anomaly history stored in the memory section 96. Having such a function for displaying operating anomaly history facilitates an understanding of the frequency and trends in the occurrence of operational anomalies so that major problems can be prevented in advance. When searching for the cause of an operational anomaly, the cause of the operational anomaly can to some degree be surmised from the history of operational anomaly occurrences. Therefore having the ability to display operational anomalies is useful for quick recovery from operational anomaly states.

Next the operation of the shot peening machine 10 according to the embodiment will be explained.

In the shot peening machine 10 according to the present embodiment, the projecting device 42 blasts the blast material onto the workpiece W shown in FIG. 1. In this embodiment, a columnar workpiece such as a coil spring is processed.

The air sorting mechanism 62 shown in FIGS. 4(A) and 4(B) is placed in a recovery path for recovering blast material blasted at workpiece W; this air sorting mechanism 62 sorts between the light weight material carried by the air current f1 and the falling heavy weight material by applying the upward air current f1 to the mixture containing the blast material and powder and granular foreign matter while allowing the mixture to free fall. Because the upward air current f1 is thus applied to the free falling mixture, sorting accuracy is improved. Sorting is also efficiently performed when large amounts of the light weight foreign matter is included in the mixture.

In the air sorting mechanism 62, the inclined portion 64B is here installed on the upstream side of the free fall zone 66B for freely falling the mixture; this inclined portion 64B inclines diagonally downward, and is used for the fluid movement of mixture to the free fall zone 66B.

The regulator plate 64C, which is disposed to form a gap between itself and the bottom end of the inclined portion 64B, allows the free fall of the mixture from the gap at the bottom end of the inclined portion 64B. The flow quantity of the mixture to the free fall zone 66B is thus regulated by the regulator plate 64C as the mixture is spread across the width direction of the regulator plate 64C and free falling, thereby facilitating the sorting of the mixture by the upward air current f1

The multiple dispersion rods 66D are placed across the perimeter wall portion 66A of the free fall zone 66B where mixture is allowed to free fall, so that free falling mixture is dispersed by the multiple dispersion rods 66D inside the perimeter wall portion 66A. By thus dispersing mixture by the dispersion rods 66D, the upward air current f1 flows in an approximately uniform manner, resulting in an easier sorting (classification) of the mixture by the air current f1.

The concave receiving portion 72 is installed at the bottom side of the opposing air sorter 66 in the air sorting mechanism 62, and after being temporarily received and stopped by the receiving portion 72, the free falling blast material is supplied to the main portion 48A of the blast material hopper 48 (see FIG. 1). Wear caused by the blast material of the components positioned at the bottom is thus constrained.

Also, in the present embodiment, the settling chamber portion 68 for creating a bypass current f2 using the guide plate 68A, is installed on the downstream side of the flow path for the light weight material in the air sorting mechanism 62; light weight material is separated by the settling chamber portion 68 into powder material carried on the bypass current f2 and granular material which falls. Powder material is then discharged to the dust collector 80 side, while granular material is discharged to the course discharge case 84 side through the course ejection pipe 82.

The improved classification capability achieved by the action explained above enables the stabilization of the grain size of the blast material supplied to the projecting device 42. As a result, a stable peening effect is obtained.

In the present embodiment, the first shot curtain machine 36 allows the blast material to fall continuously from the top portion of the blast chamber entrance 14B as shown in FIG. 1, and the second shot curtain machine 38 allows the blast material to fall continuously from the blast chamber exit 14C. Therefore even if blast material blasted by the projecting device 42 tries to scatter from the blast chamber entrance 14B and the blast chamber exit 14C, it will collide with the continuously falling blast material and thus be stopped.

Thus, the scattering of the blast material is stopped by the adoption of the first shot curtain machine 36 and the second shot curtain machine 38, thereby shrinking the overall length of the machine and enabling a reduction in the number of so-called rubber shop curtains. Also, parts which could not be sealed by the rubber curtains (e.g. the inside of coil springs, etc. when rubber sheets turn inward as the coil spring workpiece passes through) can be sealed using the first shot curtain machine 36 and the second shot curtain machine 38, so the amount of the blast material scattered to the outside is reduced.

The blast material which has fallen to the bottom of the machine is transported to the top of the machine by the bucket elevator 54 installed in the recovery pathway. Here the top discharge side of the bucket elevator 54 shown in FIGS. 1 and 2 is connected to the air sorting mechanism 62, and is also connected to the first shot curtain machine 36 and the second shot curtain machine 38 without passing through the air sorting mechanism 62. Therefore the supply of excess blast material and the like to the air sorting mechanism 62 is constrained, so the enlargement of the air sorting mechanism 62 and the dust collector 80 (see FIG. 3) is constrained.

In the shot peening machine 10 according to the present embodiment, as shown in FIGS. 5(A), 5(B), and 6, the workpiece W is held down and transported in the direction of transport by the carriers 26 when the chains 22 are looping. The pair of the spinner-rollers 28 disposed at the upper side of the chains 22 and on both sides of the carriers 26 are parallely placed on the left and right about the direction of transport of the workpiece W, and can be rotationally driven about an axial line extending in the transport direction, and the workpiece is loaded thereon. The loading of workpiece W onto the pair of spinner-rollers 28 and the rotation of the spinner-rollers 28 therefore results in thorough shot processing of the workpiece when it is subjected to blasting by the projecting device 42 (see FIG. 1).

As shown in FIG. 5(B), the spacing between the pair of spinner-rollers 28 can be variably adjusted by the variable adjustment mechanism 30. Hence the spacing between the pair of spinner-rollers 28 can be varied according to the size (diameter) of workpiece W, so that the length of the carriers 26 in the vertical direction of the machine is constrained. In other words if, for example, the spacing between a pair of spinner-rollers 28 is spread when a large workpiece W is mounted on the pair of spinner-rollers 28, the position of the top end height of the workpiece W can be kept low, which also permits the length of the carriers 26 which press down on the workpiece W to be constrained in the vertical direction of the machine, so the height of the overall shot peening machine 10 is constrained. Also, because the spacing between the pair of spinner-rollers 28 is variably adjustable, workpieces W of various outside diameters can be mounted on the pair of spinner-rollers 28, and shot processing can be applied to the workpieces W of various outside diameters.

Note that as shown in FIG. 1, the bottom surface at the lower portion of the shot peening machine 10 is formed to be flat, so there is no need to dig a pit, and enlargement of the machine can be constrained.

As explained above, using the shot peening machine 10 according to the present embodiment, recovered blast material and foreign matter can be accurately separated, while enlargement of the machine is constrained.

In the present embodiment, the display section 94 in the control panel 90A displays information about the replacement timing and replacement history of each of the consumables constituting the shot peening machine 10, therefore this display can be referred to when replacing consumables to prevent in advance changes in blast position or blast amounts, as well as transport problems.

Note that "transport problems" refers to a non-uniform blasting of blast material onto workpiece W so that a stable shot peening effect cannot be obtained, or to workpiece W becoming completely stuck inside cabinet 12 so that processing cannot be performed, as a result of workpiece W not being normally transported (e.g., due to insufficient rotation of workpiece W or sticking of workpiece W).

In this embodiment, the centrifugal type of projecting devices 42 were used as the projecting device, but the projecting device can also be of another type, such as an air nozzle type of projecting device by which projection material is fed out under pressure together with compressed air and jetted from a nozzle.

Also, in the embodiment, the shot processing machine was the shot peening machine 10, but the shot processing machine can also be another type of shot processing machine, such as a shot blasting machine or the like. A machine of the same constitution as the shot peening machine 10 may also be used as a combined shot peening machine and shot blasting machine.

In the embodiment, as shown in FIG. 4(A), the air sorting mechanism 62 comprises the inclined portion 64B and the regulator plate 64C, but it is also acceptable for the air sorting mechanism not to comprise these.

In the embodiment, the regulator plate 64C is affixed to the partition between the supply portion 64 and the opposing air sorter 66 to prevent changes in orientation, but the regulator plate may also be another regulator plate whereby its top end portion is capable, for example, of rotationally moving about an axis in the separator width direction (perpendicular to the paper surface in FIG. 4(A)).

Also, in the embodiment, the air sorting mechanism 62 comprises multiple dispersion rods 66D, but a constitution may also be adopted in which the air sorting mechanism does not comprise multiple dispersion rods.

In the embodiment, the concave receiving portion 72 is placed at the lower side of the opposing air sorter 66 in the air sorting mechanism 62, but a constitution may also be adopted in which such a receiving portion is not placed at the lower side of the air sorting mechanism.

In the embodiment, the settling chamber portion 68 is placed on the downstream side of the flow path for light weight material in the air sorting mechanism 62, but a constitution may also be adopted in which an approximately columnar cyclone section is provided in place of the settling chamber portion 68 or the settling chamber portion is not provided.

As an alternative example of the embodiment, a constitution may also be adopted in which the top portion discharge side of the bucket elevator 54 serving as shot transport machine is connected to the first shot curtain machine 36 and the second shot curtain machine 38 through the air sorting mechanism 62.

In the above embodiment, the shot transport machine for transporting blast material fallen to the bottom of the machine to the top part of the machine, is the bucket elevator 54 as shown in FIG. 2, etc., but the shot transport machine may also be another shot transport machine, such as a screw conveyor for which the axial direction is set to be the vertical direction of the machine.

In the embodiment, as shown in FIGS. 5(A) and 5(B), the variable adjustment mechanism 30 comprises the rotating arms 30A, and is variably adjusted by rotationally moving the spacing between the pair of spinner-rollers 28 as a pair of rotating rollers, but the variable adjustment mechanism can also be another variable adjustment mechanism comprising, for example, a rack and pinion, whereby variable adjustment is accomplished by linear movement of the spacing between a pair of rotating rollers. A constitution is also possible in which the shot processing machine does not comprise a variable adjustment mechanism.

As an alternative example of the embodiment, a part of the bottom surface at the bottom of the machine may be set to have a different height from that of other parts of the bottom surface.

As an alternative example of the embodiment, a constitution may also be adopted which does not comprise the calculation section 92 for calculating the replacement timing of consumables, and does not comprise the memory section 96 for storing information about the replacement history of consumables.

Note that in the present embodiment, the display section 94 can display the calculation results of the calculation section 92, and can display replacement history information stored in the memory section 96, but it is also acceptable to separately provide a display section able to display the calculation results of the calculation section 92 and a display section able to display information about replacement history stored in the memory section 96.

Note that the embodiment and multiple variant examples may be combined and practiced as appropriate.

What is claimed is:

1. A shot processing machine comprising:
    a projecting device for projecting blast material onto a workpiece;
    a recovery mechanism for recovering blast material blasted by the projecting device; and
    an air sorting mechanism for applying an upward air current to recovered blast material and allowing the recovered blast material to fall freely, thereby separating foreign matter mixed into the recovered blast material from that recovered blast material,
    the air sorting mechanism comprising;
        a freefall zone in which the upward air current is generated, and the recovered blast material is allowed to fall freely; and
        a supply portion, a bottom most portion of which communicates with the free fall zone through an opening portion, by which recovered blast material is supplied, wherein the opening portion is formed between a regulator plate disposed to extend in the vertical direction on the free fall zone side of the supply portion, and an inclined portion extending diagonally downward at an incline toward said regulator plate and toward the free fall zone of the supply portion,
    the shot processing machine further comprising;
        a cabinet within which is formed a blast chamber wherein blast material is blasted, comprising a blast chamber entrance for loading workpieces into the blast chamber, and a blast chamber exit for discharging workpieces from the blast chamber;
        a first shot curtain machine for causing blast material to fall in a curtain shape from a top of the blast chamber entrance;
        a second shot curtain machine for causing blast material to fall in a curtain shape from a top of the blast chamber exit;
        the recovery mechanism for recovering blasted blast material from the blast chamber;
        and a distribution box for distributing blast material recovered by the recovery mechanism to the first shot curtain machine and the second shot curtain machine and the air sorting mechanism.

2. A shot processing machine of claim 1, wherein the air sorting mechanism comprises multiple dispersion rods placed across the free fall zone.

3. A shot processing machine of claim 1, wherein the air sorting mechanism comprises a concave receiving portion for receiving free fallen blast material, disposed at a bottom of the free fall zone.

4. A shot processing machine of claim 1, wherein the air sorter mechanism comprises a settling chamber communicating with an upper part of the free fall zone,
    and wherein in this settling chamber, a bypass current is created by a guide plate, and foreign matter is separated into powder material carried by the bypass current and granular material, which falls.

5. A shot processing machine of claim 1, wherein blast material from which foreign matter has been separated by the air sorting mechanism is supplied to the projecting device.

6. A shot processing machine of claim 2, further comprising:
    a conveyor means for conveying workpieces to a position at which blast material is blasted from the projecting device;
    whereby the conveyor means comprises:
    a chain conveyor belt having a rotationally driven endless chain, and a carrier attached to an outer perimeter of the chain for supporting workpieces;
    and a pair of rotating rollers disposed on both sides of the carrier in a direction of workpiece transport, capable of rotating and swinging about an axial line extending in a direction of workpiece transport.

7. A shot processing machine of claim 6, wherein a variable adjustment mechanism is provided, with which spacing between the pair of rotating rollers can be variably adjusted.

8. A shot processing machine of any of claim 1, wherein a bottom surface of the shot processing machine is formed to be flat.

9. A shot processing machine of any of claim 1, further comprising a control device having a calculating section for comparing operating times of consumable parts with which the shot processing machine is equipped to pre-set lifespan times so as to calculate replacement timing for the consumable parts and a display section capable of displaying the calculation results of the calculation section.

10. A shot processing machine of any of claim 1, further comprising a control device having a memory section into which information on a replacement history of consumable parts in the shot processing machine is input for storing said replacement history information and a display section capable of displaying the replacement history information stored in the memory section.

11. A shot processing machine of claim 2, wherein the air sorting mechanism comprises a concave receiving portion for receiving free fallen blast material, disposed at a bottom of the free fall zone.

12. A shot processing machine of claim 2, wherein the air sorter mechanism comprises a settling chamber communicating with an upper part of the free fall zone,
and wherein in this settling chamber, a bypass current is created by a guide plate, and foreign matter is separated into powder material carried by the bypass current and granular material, which falls.

13. A shot processing machine of claim 2, further comprising;
a cabinet within which is formed a blast chamber wherein blast material is blasted, comprising a blast chamber entrance for loading workpieces into the blast chamber, and a blast chamber exit for discharging workpieces from the blast chamber;
a first shot curtain machine for causing blast material to fall in a curtain shape from a top of the blast chamber entrance;
a second shot curtain machine for causing blast material to fall in a curtain shape from a top of the blast chamber exit;
the recovery mechanism for recovering blasted blast material from the blast chamber;
and a distribution box for distributing blast material recovered by the recovery mechanism to the first shot curtain machine and the second shot curtain machine.

14. A shot processing machine of claim 2, wherein blast material from which foreign matter has been separated by the air sorting mechanism is supplied to the projecting device.

15. A shot processing machine of claim 1, further comprising:
a conveyor means for conveying workpieces to a position at which blast material is blasted from the projecting device;
whereby the conveyor means comprises:
a chain conveyor belt having a rotationally driven endless chain, and a carrier attached to an outer perimeter of the chain for supporting workpieces;
and a pair of rotating rollers disposed on both sides of the carrier in a direction of workpiece transport, capable of rotating and swinging about an axial line extending in the direction of workpiece transport.

16. A shot processing machine of any of claim 2, wherein a bottom surface of the shot processing machine is formed to be flat.

17. A shot processing machine of any of claim 2, further comprising a control device having a calculating section for comparing operating times of consumable parts with which the shot processing machine is equipped to pre-set lifespan times so as to calculate replacement timing for the consumable parts and a display section capable of displaying the calculation results of the calculation section.

18. A shot processing machine of any of claim 2, further comprising a control device having a memory section into which information on a replacement history of consumable parts in the shot processing machine is input for storing said replacement history information and a display section capable of displaying the replacement history information stored in the memory section.

* * * * *